United States Patent [19]

Whitted, III et al.

[11] Patent Number: 5,564,030
[45] Date of Patent: Oct. 8, 1996

[54] CIRCUIT AND METHOD FOR DETECTING SEGMENT LIMIT ERRORS FOR CODE FETCHES

[75] Inventors: Graham B. Whitted, III, Irvine; Hsiao-Shih Chang, Orange; James A. Kane, Newport Beach, all of Calif.

[73] Assignee: Meridian Semiconductor, Inc., Irvine, Calif.

[21] Appl. No.: 193,289

[22] Filed: Feb. 8, 1994

[51] Int. Cl.[6] ............................................. G06F 12/00
[52] U.S. Cl. ................................ 395/411; 395/421.1
[58] Field of Search ............................ 395/400, 425, 395/700, 800, 411, 421.1

[56] References Cited

U.S. PATENT DOCUMENTS

| | | | |
|---|---|---|---|
| 3,814,919 | 6/1974 | Repton et al. | 395/183.01 |
| 4,442,484 | 4/1984 | Childs, Jr. et al. | 395/490 |
| 4,851,989 | 7/1989 | Kagimasa et al. | 395/416 |
| 5,144,551 | 9/1992 | Cepulis | 395/490 |
| 5,274,834 | 12/1993 | Kardach et al. | 395/800 |
| 5,321,836 | 6/1994 | Crawford et al. | 395/416 |
| 5,418,956 | 5/1995 | Willman | 395/700 |

*Primary Examiner*—Jack A. Lane
*Attorney, Agent, or Firm*—Knobbe, Martens, Olson & Bear

[57] ABSTRACT

A segment limit check circuit performs limit checks on fetch addresses generated by a CPU. The circuit and method for performing the fetch limit check are simplified over the prior art by effectively moving the fetch limit check to linear address space. For a microprocessor that uses physical addresses of 32-bits and performs fetches as 16-byte aligned accesses, the circuit of the present invention generates a 33-bit linear address and a 33-bit upper limit value. A comparator compares the upper 29 bits of the linear address with the upper 29-bits of the upper limit value. If a match occurs, the circuit decodes the 4 low-order bits of the upper limit value to determine which of the 16 instruction bytes (if any) fall outside the segment limit.

2 Claims, 4 Drawing Sheets

1

CIRCUIT AND METHOD FOR DETECTING SEGMENT LIMIT ERRORS FOR CODE FETCHES

FIELD OF THE INVENTION

This invention relates to microprocessors which use segmentation. In particular, this invention relates to a circuit and method for performing segment limit checks on addresses used for code fetches.

BACKGROUND OF THE INVENTION

Segmentation is a memory management scheme wherein a microprocessor allows software to define multiple variable-size "segments" of memory, and then limits access to particular segments based upon the type of operation being performed. Definable segments include a code segment for storing instruction data, a stack segment for storing stack data (i.e., operand data for macroinstructions such as PUSH, POP and CALL), and one or more data segments for storing program data. Once the segments have been defined, the microprocessor accesses individual segments by default based upon the type of operation being performed. For example, fetches of instruction data by the microprocessor ("code-fetches" or "fetches") are normally performed from the code segment. Programmers can thereby reference memory by specifying an offset into a default (or a designated) segment, without being concerned with the actual physical memory location/s being accessed.

Microprocessors that use segmentation typically have one segment register for each type of segment supported. The segment registers are loaded by an operating system prior to execution of an application program. The value loaded into each segment register specifies a starting byte address or "segment base address" for the respective segment, and an upper-most byte address or "limit address" for the segment. For purposes of this application, it may be assumed that a set of segment base registers is used to hold the segment base addresses, and that a set of limit address registers is used to hold the limit addresses.

Once the segment registers have been loaded and program execution is initiated, a typical microprocessor that uses segmentation will operate as follows. A central processing unit (CPU) of the microprocessor generates fetch commands for retrieving instructions from memory, and generates operand access commands for performing data and stack accesses to memory. With each fetch command or operand access command, the CPU generates an effective address and indicates a selected segment. The CPU also generates size bits to indicate the number of bytes to be accessed. A segmentation unit of the microprocessor adds each effective address generated by the CPU to the segment base address for the selected segment to generate a linear address. Each effective address thereby serves as an offset into a selected segment.

A paging unit of the microprocessor may optionally modify a fixed number of high-order bits of the linear address to produce a physical address. Physical addresses are used to access an internal cache, and may be placed on an external bus to access physical memory (and/or an external cache memory). If paging is not used, linear addresses generated by the segmentation unit are used as physical addresses.

2

Each time the microprocessor performs an access to memory (or cache), the microprocessor performs an address limit check to ensure that memory is not being accessed outside the selected segment. Limit checking catches certain programming errors such as runaway subscripts and invalid pointer calculations. To perform the limit check, the microprocessor uses the limit address specified by the appropriate limit address register to determine whether one or more byte locations will be accessed that fall outside the selected segment. Addresses held by the limit address registers are effective addresses.

If a limit error is detected, the microprocessor responds differently depending upon the type of access being performed. If the limit error is detected on an operand write, for example, the microprocessor will abort the write operation, thereby preventing data outside the segment from being corrupted. The microprocessor will then generate an exception and enter into a limit-error handling routine. If the limit error is detected on a code-fetch, the microprocessor will generate an exception only if the instruction data for which the limit error was detected is actually executed. This prevents limit exceptions from being generated for data that is fetched from memory but not executed by the CPU.

The conventional method for performing limit checks for both code and operand accesses is to perform the check in effective address space. To perform a limit check on an operand access ("operand limit check") by the conventional method, a limit check circuit uses the effective address generated by the CPU along with size bits to determine the effective addresses of the byte locations to be accessed. These effective addresses are compared with the effective limit address specified by the appropriate limit address register.

The conventional method for performing address limit checks for fetch accesses ("fetch limit checks") is more complicated. Since microprocessors commonly perform fetches as N-byte aligned accesses, the limit check circuit must additionally determine which N-byte aligned block or "line" of fetch data will be accessed in physical memory once the segment base address is added in. Although this determination is relatively simple when the segment base address is also N-byte aligned, the addition of a significant quantity of logic is required to account for the possibility that non-aligned segment base addresses will used. This additional logic uses the X low-order bits of the segment base address to determine which N-byte line will actually be referenced by the linear address, where $2^x = N$.

The present invention presents an alternative method for performing fetch limit checks which significantly reduces the complexity of the limit check circuit. In describing the present invention, reference will be made to address sizes and certain methods for performing fetch accesses. It should be understood, however, that such references are being made only to describe one exemplary microprocessor to which the present invention may be applied, and are not intended to limit the scope of the invention.

SUMMARY OF THE INVENTION

The present invention involves a circuit and method that significantly reduces the complexity of the logic check circuit by effectively moving the limit check for fetches to linear address space. The special logic used by the prior art to account for non-N-byte aligned segment base addresses is thereby eliminated.

For a preferred embodiment of a microprocessor wherein address paths are 32-bits wide and fetches are performed as 16-byte aligned accesses, the fetch limit check is performed as follows. Every time the CPU generates a fetch request the fetch limit check circuit generates 16 limit-check status bits. Each limit-check status bit corresponds to one of the 16 bytes to be fetched, and indicates whether or not the instruction byte exceeds the segment limit in physical memory.

The limit-check status bits are generated as follows. A first adder generates a 33-bit linear address by adding the 32-bit effective address generated by the CPU to the 32-bit segment base address specified by the appropriate segment base address. A second adder generates a 33-bit upper limit value by adding the 32-bit effective address to the 32-bit limit address specified by the appropriate limit address register.

A 29-bit comparator compares the high-order 29 bits of the linear address to the high-order 29 bits of the upper limit value. If the high-order 29 bits of the linear address are greater than the high-order 29 bits of the upper limit value, the circuit indicates that all 16 of the byte locations exceed the segment limit. This is done in the preferred embodiment by setting all 16 of the limit-check status bits to one. If the high-order 29 bits of the linear address are less than the high-order 29 bits of the upper limit value, the circuit indicates that none of the 16 byte locations exceed the segment limit. This is done in the preferred embodiment by generating 16 zeros as the 16 limit check status bits.

If the high-order 29 bits of the linear address are equal to the high-order 29 bits of the upper limit value, indicating that the effective address and the limit address reference the same 16-byte line in physical memory, a decode circuit is used to determine which of the 16 byte locations (if any) exceed the segment limit. This decode circuit generates the 16 limit-check status bits directly from the four least significant bits of the upper limit value. Limit-check status bits are set to one by the decode circuit for byte locations that exceed the segment limit, and are set to zero for byte locations that do not exceed the segment limit.

The invention is equally applicable to other microprocessors that perform fetches as aligned accesses. For a microprocessor that performs fetches as N-byte aligned accesses, the comparator compares all but the X low-order bits of the linear address to all but the lower X bits of the upper limit, where $2^x = N$. The X low-order bits of the upper limit value are then used to generate the 16 limit-check status bits when the two compare values are equal.

BRIEF DESCRIPTION OF THE DRAWINGS

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENT

Figure 1A:
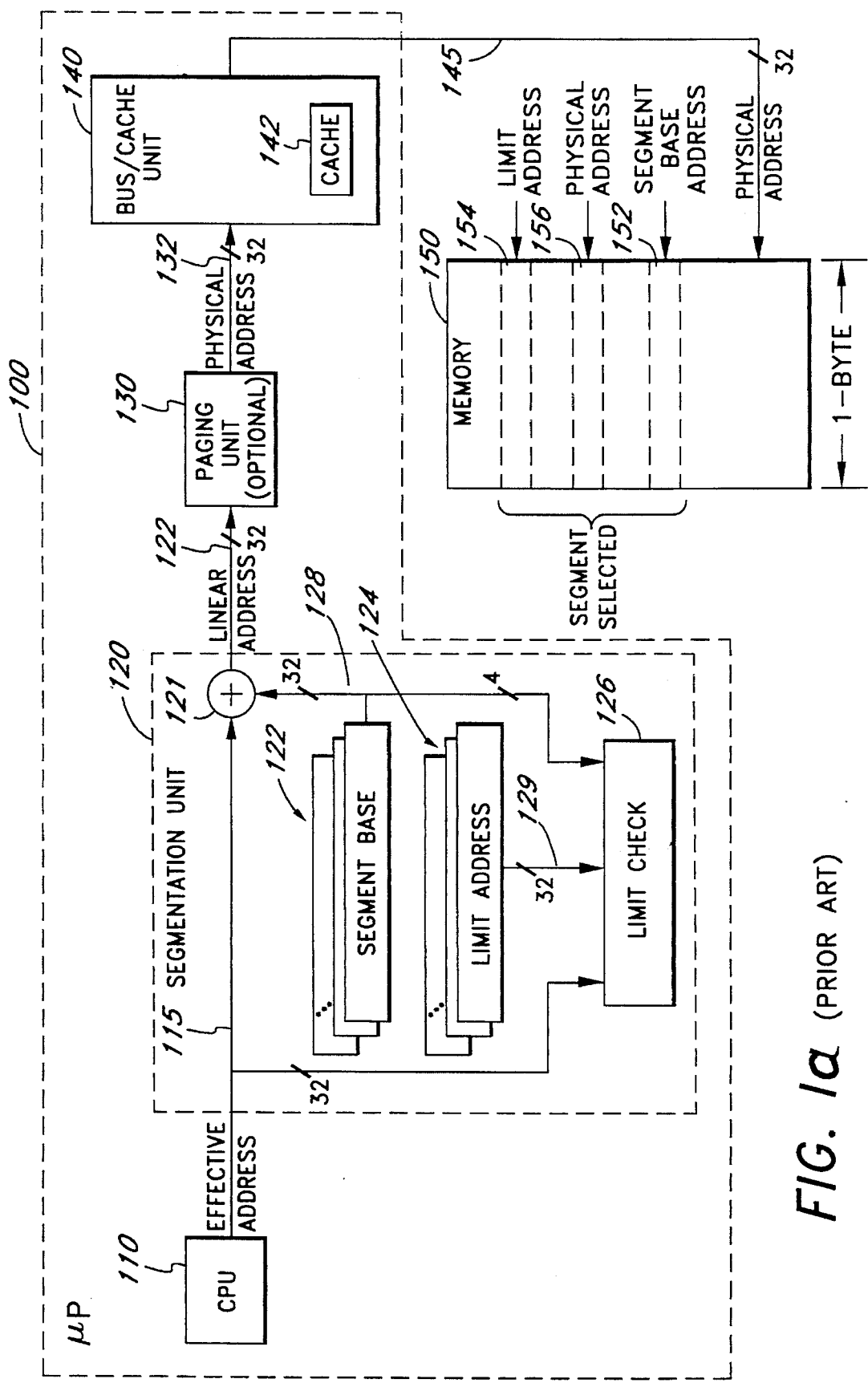
FIG. 1a illustrates a prior art microprocessor to which the present invention may be applied.

FIG. 1a illustrates the addressing scheme of a prior art microprocessor 100 suitable for application of the present invention. This figure will be used to explain segmentation and limit checking generally, and will additionally be used to explain the prior art method for performing limit checks. The microprocessor 100 has a CPU 110, a segmentation unit 120, a paging unit 130, and a bus/cache unit 140. The segmentation unit 120 has an adder 121, multiple segment base registers 123, multiple limit address registers 124, and a limit check circuit 126. The bus/cache unit 140 has a cache 142. The microprocessor 100 is connected to a physical memory 150 (memory) by an address bus 145.

The CPU 110 is connected to the adder 121 and the limit check circuit 126 by a 32-bit address bus 115. The segment base registers 123 are connected to the adder 121 by a 32-bit bus 128 (multiplexers for selecting between the segment base registers 123 are not shown). The four low-order bit lines of the bus 128 are connected to the limit check circuit 126. The limit address registers 124 are connected to the limit check circuit 126 by a 32-bit bus 129. The output of the adder 121 is connected to the paging unit 130 by a 32-bit address bus 122. The paging unit 130 is connected to the bus/cache unit 140 by a 32-bit address bus 132.

The general operation of the circuit of FIG. 1a will now be described. The CPU 110 generates a 32-bit effective address on the bus 115 for performing a code fetch or an operand access. The effective address is the address "seen" by the programmer, and is in the form of an offset into a memory segment. The segmentation unit 120 uses the adder 121 to add the effective address to a segment base address to produce a 32-bit linear address on the bus 122. The segment base address is specified by one of the segment base registers 123. The segment base register used with a given effective address depends upon the type of operation being performed by the CPU 110, and whether or not an override segment has been specified by the programmer. The limit address registers 124 specify the limit addresses for the respective segments. Limit addresses specified by the limit address registers 124 are in the form of effective addresses.

The paging unit 130 translates the linear address on the bus 122 into a 32-bit physical address on the bus 132 by modifying the high-order 20 bits of the linear address. If the microprocessor 100 does not use a paging unit 130 the linear address and the physical address are the same. A bus/cache unit 140 uses the 32-bit physical address to access the cache 142 and/or the memory 150. If the access being performed by the CPU 110 requires access to multiple byte locations in the memory 150, the bus/cache unit 140 toggles the appropriate low-order address bits and/or byte enable lines (not shown) of the bus 145 to address each individual byte location.

As shown in dashed lines, the segment base address defines the lower boundary 152 (i.e., the lowest byte address) in the physical memory 150 of the selected segment. The limit address for the selected segment defines the upper limit 154 (i.e., the highest byte address) in the physical memory 150 of the segment. The physical address on the external address bus 145 (including byte enable lines) references one or more byte locations 156 (shown as one byte location in FIG. 1a).

To ensure that memory accesses are not performed outside the selected segment, the limit check circuit 126 determines whether any of the target byte locations 156 for a given fetch or operand access exceed the upper limit 154 defined by the limit address. The limit check is performed during an address generation phase for each operand or fetch access, allowing the access to memory 150 to be aborted if necessary.

For purposes of the description which follows, it may be assumed that the microprocessor 100 performs all fetches as 16-byte aligned accesses. Thus, when the bus/cache unit 140 receives a fetch request it returns the 16 bytes falling from PA[31:4,0000]to PA[31:4,1111]("PA"="physical address"). Stated differently, the bus/cache unit 140 ignores the 4 least significant bits ("LSBs") of the physical address on the bus 132 when it receives a fetch command, and retrieves the 16-byte line referenced by bits 31-4 of the physical address.

Referring to FIG. 1*a* , prior art microprocessors perform the limit check in effective address space by comparing the effective address generated by the CPU 110 on the bus 115 to the (effective) limit address specified by the appropriate limit address register 124. For fetch accesses, this comparison is relatively simple if the segment base address is aligned on a 16-byte boundary. If it is known that the segment base address is so aligned, the limit check for a fetch access can be performed by comparing the upper 28 bits of the effective address with the upper 28 bits of the limit address to determine whether both reference the same 16-byte line. If a match occurs, the 4 LSBs of the limit address can then be used to determine which of the instruction bytes fall outside the selected segment.

This prior art method for performing the fetch limit check becomes more complicated when non 16-byte aligned segment base addresses are used. This problem can be illustrated by the following example. Assume that the CPU 110 generates a 32-bit effective address of 00005555H (i.e., $00005555_{16}$) for performing a fetch access, and that the 32-bit limit address for the selected segment is 00005560H. If it is known that the segment base address to be added to the effective address is 16-byte aligned, it can readily be determined that no limit error will occur since 0000555H (the upper 28 bits of the effective address) is less than 0000556H (the upper 28 bits of the limit address). This result is the same regardless of the value of the 16-byte aligned segment base address.

If the segment base addresses is not 16-byte aligned, the comparison becomes more complex. Assume, for example, that the segment base address for the selected segment is 0000001BH, resulting in a linear fetch address of 00005570H and a linear limit address of 0000557BH. Since the microprocessor 100 performs fetches as 16-byte aligned accesses, limit errors will occur for instruction bytes fetched from addresses 0000557CH, 0000557DH, 0000557EH and 0000557FH. Thus, a limit error occurs which would not be detected merely by comparing the effective address with the effective limit address. This situation occurs in this example because the addition of the four LSBs of the segment base address results in a 16-byte boundary cross when added to the effective address of 00005555H, but does not result in a 16-byte boundary cross when added to the limit address of 00005560H.

Referring to FIG. 1*a* , the four LSBs of the segment base address on the bus 128 are fed to the limit check circuit 126 to handle this situation. These four LSBs of the segment base address are used by special logic of the prior art limit check circuit 126 when fetches are performed. This logic determines whether a 16-byte boundary will be crossed when the 4 LSBs of the segment base address are added to either the effective address or the limit address. This logic thus effectively determines which 16-byte line will actually be accessed in the memory 150 once the non-aligned segment base address is added in. Extra logic is also required to determine which of the 16 byte locations (if any) exceed the limit address when a non 16-byte aligned segment base address is used. The addition of such logic adds considerable complexity to the limit check circuit 126.

It should be recognized that this problem with the prior art method is not limited to microprocessors that perform fetches as 16-byte aligned accesses. To state the problem in general terms for microprocessors that perform fetches as N-byte aligned accesses, a limit check circuit in accordance with the prior art would evaluate the lower X bits of the segment base address, where $2^x = N$.

Figure 1B:
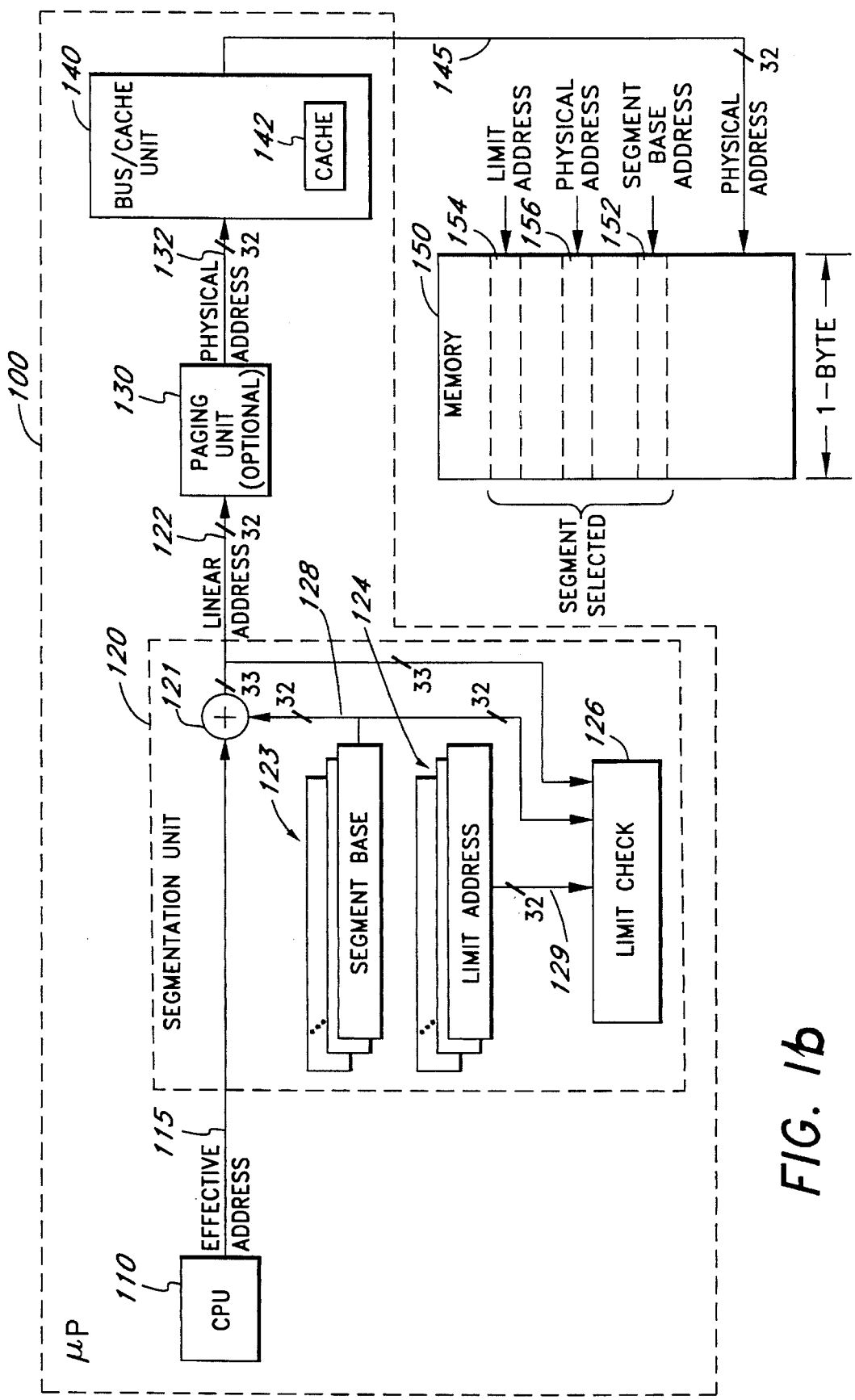
FIG. 1b illustrates the microprocessor of FIG. 1a as modified to perform limit checks in accordance with the present invention.

FIG. 1*b* illustrates an improved method in accordance with the present invention for performing fetch limit checks. The complexity of the limit check circuit 126 is simplified by effectively moving the limit check to linear address space. Referring to FIG. 1*b* , an adder 121 that generates a carry bit is used to generate a 33-bit linear address on the bus 122. The adder 121 has a first input connected to the bus address bus 115, and a second input connected to the bus 128. The bus 122 is connected to the limit check circuit 126. The 32 low-order bit lines of bus 122 (i.e., bits 31:0) are connected to the paging unit 130. All lines of the 32 bit bus 128 are now connected to the limit check circuit 126.

Figure 2:
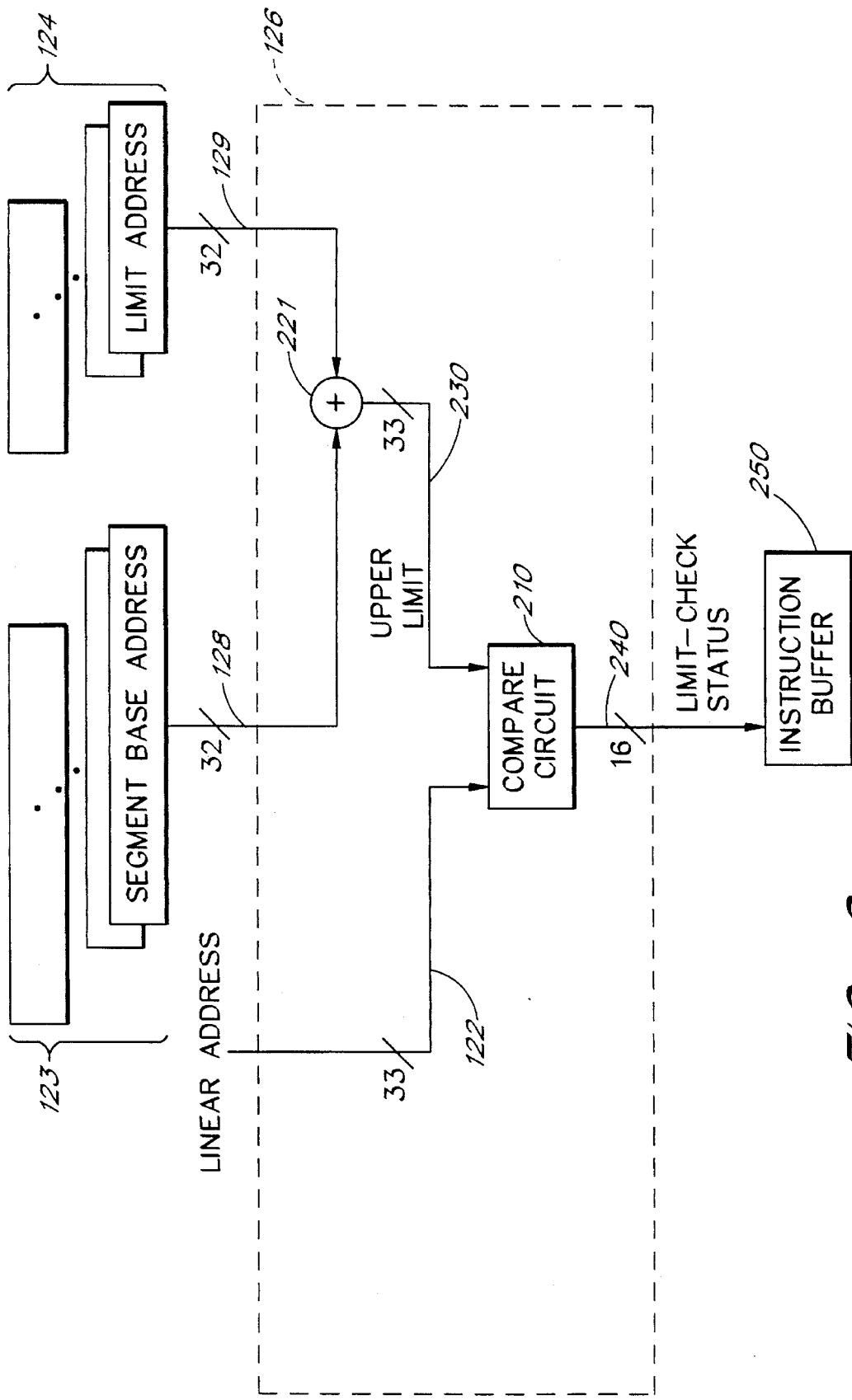
FIG. 2 is a high-level diagram of a fetch limit check circuit in accordance with the present invention.

FIG. 2 is a high level diagram of the limit check circuit 126. The 32-bit bus 128 from the segment base registers 123 is connected as a first input to an adder 221. A 32-bit bus 129 from the limit address registers 124 is connected as a second input to the adder 221. Multiplexers for selecting one of the segment base registers 123 and one of the limit address registers 124 are omitted to simplify the figure. (One skilled in the art will appreciate that the various registers can be connected to common tri-state busses so that multiplexers are not required.)

The 33-bit bus 122 is connected as a first input to a compare circuit 210. The output of the adder 221 is connected as a second input to the compare circuit 210 by a 33-bit bus 230. The output of the compare circuit 210 is connected to an instruction buffer 250 by a 16-bit bus 240.

The general operation of the limit check circuit 126 of FIGS. 1*b* and 2 will now be described. Whenever an effective address for a fetch request is generated by the CPU 110, the 32-bit effective address on the bus 115 is added to the 32-bit segment base address on the bus 128 by the adder 121. The adder 121 generates a 33-bit linear address on the bus 122 (the lower 32 of which are passed to the paging unit 130 as shown in FIG. 1*b* ). The 33rd bit (i.e., the most significant bit) of this linear address is a carry bit to indicate a wrap-around addressing condition. Also, during every fetch request, the adder 221 adds the segment base address on the bus 128 to the limit address on the bus 129. The adder 221 generates a 33-bit upper limit value on the bus 230.

The linear address value on the bus 122 and the upper limit value on the bus 230 are routed to the compare circuit 210. The compare circuit 210 generates 16 limit-check status bits on the bus 240 whenever a fetch request is generated by the CPU 110. Each limit-check status bit corresponds to one of the 16 instruction bytes to be fetched, and indicates whether a limit error was detected for the instruction byte. In the preferred embodiment, a limit-check status bit of one indicates that a limit error was detected.

As instruction fetches are performed by the bus/cache unit 140 (FIG. 1*b* ), limit-check status data is passed on the bus 240 (FIG. 2) to an instruction buffer 250 where it is held with the corresponding instruction data until execution. Upon execution of an instruction, the CPU 110 checks the limit-check status bits for each byte of the instruction and generates a limit error exception if a bit is set.

Figure 3:
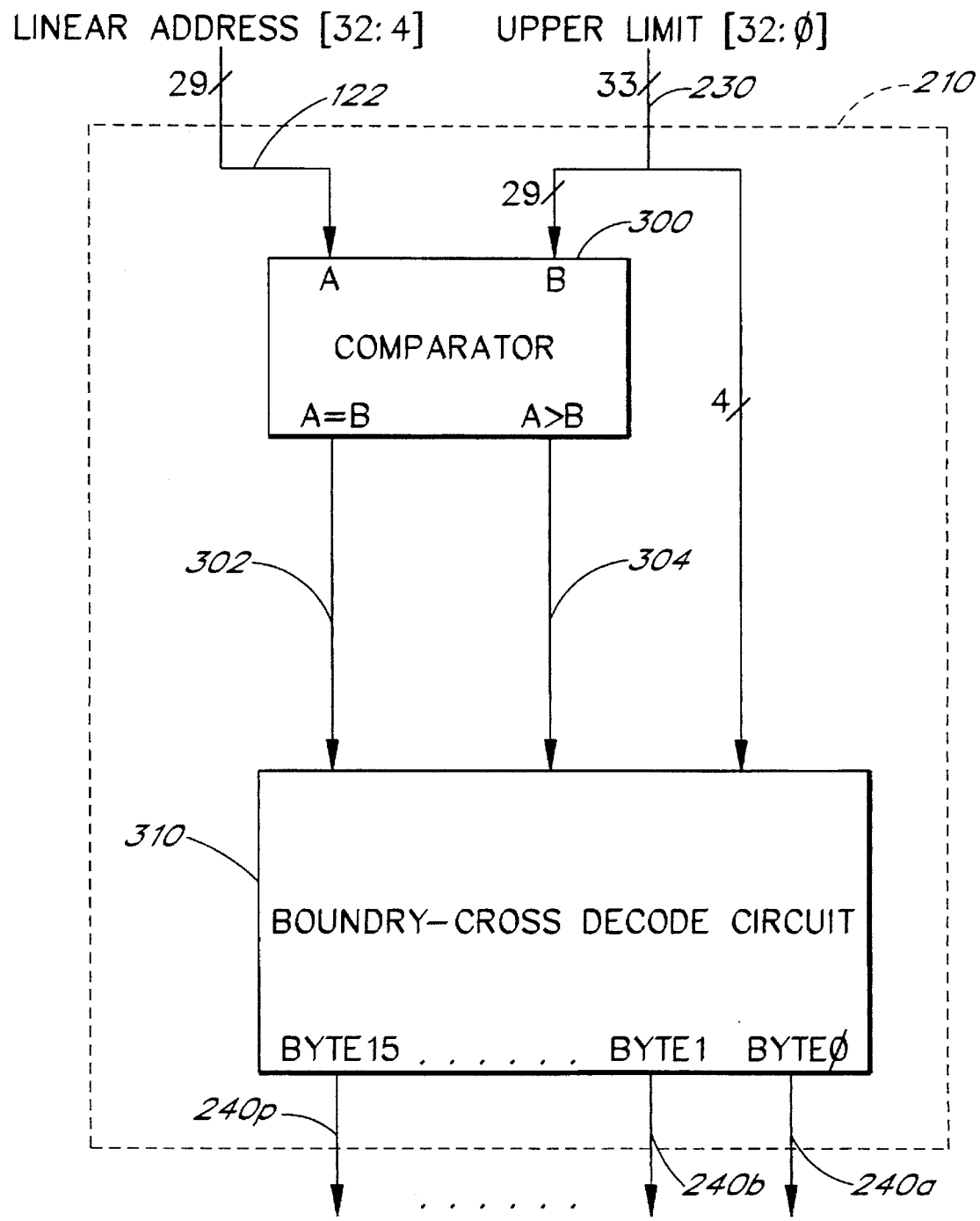
FIG. 3 is a high-level diagram of the compare circuit of FIG. 2.

FIG. 3 illustrates an embodiment of the compare circuit 210. The compare circuit 210 comprises a 29-bit comparator 300 and a boundary-cross decode circuit 310. The upper 29 lines of the bus 122 are connected as a first data input (A) to the comparator 300. The upper 29 lines of the bus 230 are connected as a second data input (B) to the comparator 300. The comparator 300 has an output line 302 that goes high when the A and B inputs are equal. The comparator also has an output line 304 that goes high when the A input is greater than the B input.

The line 302 is connected as a first input to the boundary-cross decode circuit 310. The line 304 is connected as a second input to the boundary-cross decode circuit 310. The low-order 4 lines of the bus 230 (i.e., bits 3:0) are also connected as an input to the boundary-cross decode circuit 310. The boundary-cross decode circuit 310 has 16 outputs 240a–240p corresponding to the 16 bytes of instruction data to be fetched. The truth table for the boundary-cross decode circuit 310 is shown in Table 1 where a "0" in the status column indicates a valid instruction byte and a "1" indicates an invalid instruction byte, and where the left-most byte is byte 15 and the right-most byte is byte 0 (see FIG. 3). An "x" in Table 1 indicates a "don't care" situation.

The operation of the circuit of FIG. 3 will now be described. When LA[32:4]>UL[32:4](i.e., linear address bits 32:4 are greater than upper limit bits 32:4), the line 302 (A=B) goes low and the line 304 (A>B) goes high. This causes the output lines 240a–240p to go high as indicated by Table 1, indicating that all bytes to be fetched using the linear address on the bus 122 exceed the upper limit 154 (FIG. 1b) in physical memory 150. If LA[32:4]<UL[32:4], the line 302 goes low and the line 304 goes low. This causes the output lines 240a–240p to go low as indicated by Table 1, indicating that none of the bytes to be fetched exceeds the upper limit 154.

TABLE 1

| A=B | A>B | UPPER LIMIT[3:0] (hexadecimal) | LIMIT-CHECK STATUS (binary) |
|---|---|---|---|
| 0 | 0 | x | 0000000000000000 |
| 0 | 1 | x | 1111111111111111 |
| 1 | x | 0 | 1111111111111110 |
| 1 | x | 1 | 1111111111111100 |
| 1 | x | 2 | 1111111111111000 |
| 1 | x | 3 | 1111111111110000 |
| 1 | x | 4 | 1111111111100000 |
| 1 | x | 5 | 1111111111000000 |
| 1 | x | 6 | 1111111110000000 |
| 1 | x | 7 | 1111111100000000 |
| 1 | x | 8 | 1111111000000000 |
| 1 | x | 9 | 1111110000000000 |
| 1 | x | A | 1111100000000000 |
| 1 | x | B | 1111000000000000 |
| 1 | x | C | 1110000000000000 |
| 1 | x | D | 1100000000000000 |
| 1 | x | E | 1000000000000000 |
| 1 | x | F | 0000000000000000 |

If LA[32:4]=UL[32:4], the line 302 goes high and the line 304 goes low, indicating that the effective address and the limit address reference the same 16-byte line in physical memory 150 once the segment base address is added in. In this situation, the boundary-cross decode circuit 310 uses the lower 4 bits UL[3:0] of the upper limit value on the bus 230 to determine which of the bytes of fetch data, if any, fall above the upper limit 154. As indicated by Table 1, byte locations falling on or below the upper limit 154 are effectively marked as being good (i.e., falling within the selected segment) and byte locations falling above the limit address are marked as being bad.

In the preferred embodiment, the limit-check status bits on the lines 240a–240p are clocked into a 16-bit register (not shown), and are held by the register as the fetch from memory 150 (or cache 142) is performed. The status bits are then routed to the instruction buffer 250 (FIG. 2) as instructions are returned by the bus/cache unit 140. The status bits are stored with corresponding instruction bytes within the instruction buffer, and are evaluated by the CPU 110 upon instruction execution.

It should be recognized that the generation of 16 separate limit-check status bits is merely one of numerous possible ways of indicating the outcome of the fetch limit check. The outcome of the fetch limit check could, for example, be encoded into a 5-bit value which is passed to the CPU. Furthermore, the outcome of the limit check can be encoded with other exception check information, such as breakpoint and page fault status. Thus, the use of 16 separate limit check bits should not be construed as a limitation on the present invention.

As indicated by the foregoing, the movement of the limit check for fetches to linear address space permits the limit check to be performed using a relatively simple circuit. A comparison of the circuit of FIG. 3 with prior art designs will reveal that a significant reduction in logic is achieved by performing the fetch limit check in this manner.

As one skilled in the art will recognize, the movement of the fetch limit check to linear address space makes it desirable to also perform limit checks for operand accesses in linear address space. Assuming that the CPU 110 cannot issue a fetch command and an operand access command during the same clock cycle, the comparator 300 (FIG. 3) can be used to perform both operand and fetch limit checks.

It should also be recognized that the method used by the present invention is not limited to microprocessors having 32-bit address busses, and is not limited to microprocessors that perform fetches as 16-byte aligned accesses. For a microprocessor that performs fetches as N-byte aligned accesses and generates physical addresses of Y bits, the comparator 300 would compare LA[Y:X] to UL[Y:X], where $2^X = N$, and the boundary-cross decode circuit 310 would use the X low-order bits of the upper limit value. Thus, for example, for a microprocessor having a 64-bit address bus that performs fetches as 64-bit aligned accesses. The circuit the comparator 300 would compare LA[64:6] to UL[64:6], and the boundary-cross decode circuit 310 would use UL[0:5] to determine which bytes exceed the limit address.

The circuits and method described above for performing segment limit checks on code fetches have been presented by way of example only, and not limitation. Thus, the breadth and scope of the present invention should not be limited by any of the above-described exemplary embodiments, but should be defined only in accordance with the following claims and their equivalents.

What is claimed is:

1. A method of performing a segment limit check for a fetch request generated by a central processing unit (CPU) of a microprocessor, said microprocessor performing fetches as 16-byte aligned accesses, said method comprising the steps of:

receiving a 32-bit effective address from said CPU;

adding said 32-bit effective address to a 32-bit segment base address to produce a 33-bit linear address;

adding said 32-bit segment base address to a 32-bit segment limit address to produce a 33-bit upper limit, said 32-bit segment limit address being an effective address that specifies a segment limit in a physical memory; and comparing a first 29-bit value to a second 29-bit value, said first 29-bit value comprising the high-order 29 bits of said 33-bit linear address and said second 29-bit value comprising the high-order 29 bits of said 33-bit limit address, and performing one of:

indicating that all 16 byte locations of said fetch request exceed said segment limit in said physical memory when said first 29-bit value exceeds said second 29-bit value;

indicating that none of the 16 byte locations of said fetch request exceeds said segment limit in said physical memory when said first 29-bit value is less than said second 29-bit value; or decoding the 4 low-order bits of said 33-bit upper limit when said first 29-bit value is equal to said second 29-bit value to determine which of the 16 byte locations exceed said segment limit in said physical memory.

2. A fetch limit check circuit for a microprocessor, said microprocessor having a central processing unit (CPU) that generates a fetch request and a corresponding effective address for performing an N-byte aligned fetch from a physical memory, said microprocessor also having a first register that specifies a segment base address and having a second register that specifies a segment limit address, said limit check circuit comprising:

a first adder that adds said effective address to said segment base address to generate a linear address;

a second adder that adds said limit address to said segment base address to generate an upper limit;

a comparator that compares a first value to a second value, said first value formed from all but the X low-order bits of said linear address and said second value formed from all but the X low-order bits of said limit address, wherein $2^x=N$ and N is greater than or equal to 4, and wherein said linear address and said upper limit each comprise greater than X bits; and decode logic that receives the X low-order bits of said upper limit, and when said first value and said second value are equal determines from said X low-order bits which of N instruction bytes for said fetch request exceed a segment limit in said physical memory, wherein said first adder generates a first carry bit, said first carry bit forming a most significant bit of said linear address, and wherein said second adder generates a second carry bit, said second carry bit forming a most significant bit of said upper limit.

* * * * *